July 24, 1962    W. PERROTT    3,045,763
SHOCK ABSORBING POSITIVE DRIVE MEANS FOR MARINE PROPELLERS
Filed Oct. 26, 1959    2 Sheets-Sheet 1

INVENTOR.
WILLIAM PERROTT
BY
Jacobi & Jacobi
ATTORNEYS

July 24, 1962 W. PERROTT 3,045,763
SHOCK ABSORBING POSITIVE DRIVE MEANS FOR MARINE PROPELLERS
Filed Oct. 26, 1959 2 Sheets-Sheet 2
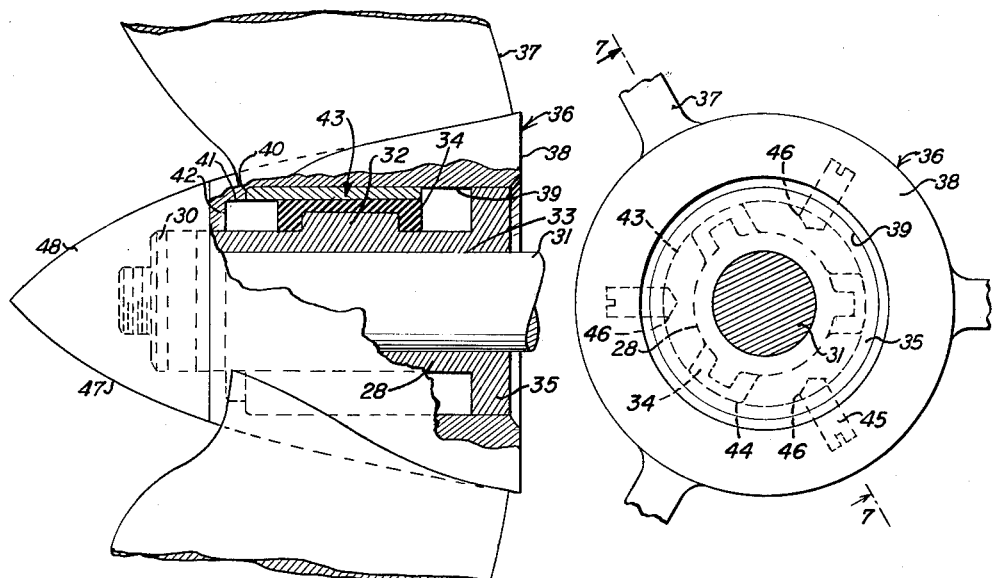
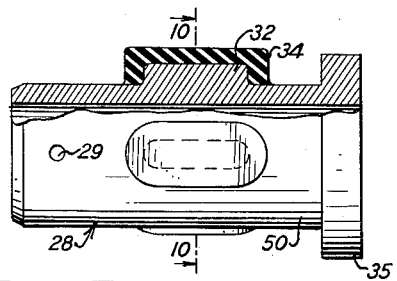
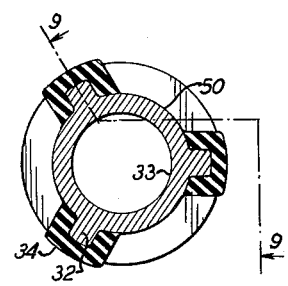
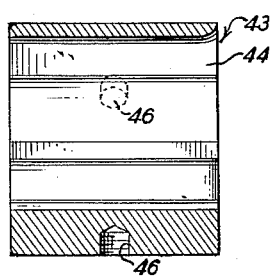
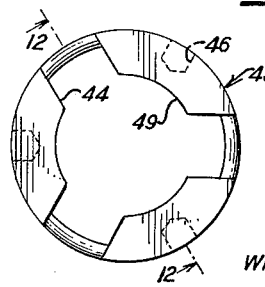
INVENTOR.
WILLIAM PERROTT
BY Jacobi & Jacobi
ATTORNEYS United States Patent Office  3,045,763
Patented July 24, 1962

3,045,763
SHOCK ABSORBING POSITIVE DRIVE MEANS FOR MARINE PROPELLERS
William Perrott, 7505 Palisade Ave., North Bergen, N.J.
Filed Oct. 26, 1959, Ser. No. 848,627
1 Claim. (Cl. 170—160.54)

This invention relates to drive mechanisms and more particularly to a shock absorbing positive drive means for marine propellers and is primarily, although not exclusively, intended for use on outboard motors.

It has been common practice in the manufacture of outboard motors to provide a rubber or other suitable resilient collet between the propeller hub and the propeller shaft or between the hub and a sleeve mounted on the propeller shaft for the purpose of providing a cushion which will serve to absorb shock occasioned by starting of the motor or by engaging the clutch which serves to connect the drive shaft to the propeller shaft and such an arrangement has proven entirely satisfactory for motors of moderate horsepower. However, with the advent of outboard motors having relatively high power capabilities of the order of twenty-five to seventy-five horsepower, considerable trouble has been experienced with undue slippage of the propeller hub on the propeller shaft with a consequent loss of power and other undesirable results. Furthermore, such slippage frequently caused undue wear of the rubber or other collet necessitating replacement of the same and such replacement represented a substantial undertaking, since specialized equipment, such as a suitable press was necessary to remove and install a new collet and consequently, such repair operations could not be carried out and frequently could not be carried out by the ordinary outboard motor repair shop. Furthermore, this slippage referred to above, represents a hazard to the operator of the boat, since such slippage might possible occur when at sea and not in a position to repair the motor and consequently, there is a possibility that the boat would be rendered sufficiently unseaworthy due to the lack of proper power to represent a real hazard to life.

It is accordingly an object of the invention to provide a shock absorbing full floating resilient positive drive means for marine propellers which may be manufactured from readily available materials and which may be incorporated in conventional outboard motors and propellers without materially changing the design thereof, it only requiring a modification of a propeller hub in order to accommodate the drive means of this invention.

A further object of this invention is the provision of a drive means for connecting an outboard motor propeller to the propeller shaft, which means provides a full floating resilient positive drive between the shaft and the propeller and at the same time, provides means for absorbing shock occasioned by starting the motor or engaging the clutch connecting the drive shaft to the propeller shaft.

A still further object of the invention is the provision of a shock absorbing full floating resilient drive means for marine propellers and particularly for propellers utilized on outboard motors, which means will in no way interfere with the normal use and function of a shear pin which is commonly provided as a safety measure in this type of mechanism.

Another object of the invention is the provision of a shock absorbing full floating resilient drive means for marine propellers which will permit convenient removal and replacement of the propeller in the event of damage thereto.

A further object of the invention is the provision of a shock absorbing full floating resilient drive means for marine propellers which will operate to absorb shock occasioned by starting of the motor or engaging the clutch connecting the drive shaft and the propeller shaft and in which means is incorporated providing for the accurate alignment of the propeller on the propeller shaft.

A still further object of the invention is the provision of a shock absorbing full floating resilient drive means for marine propellers and particularly for propellers utilized on outboard motors and in which the drive means may be installed merely by enlarging the bore in the propeller hub.

Another object of the invention is the provision of a shock absorbing full floating resilient drive means for marine propellers and particularly for propellers utilized on outboard motors, which means may be incorporated as original equipment in a new motor or which may be installed in an older motor by a relatively simple modification of the propeller hub.

Further objects and advantages of the invention will be apparent from the following description taken in conjunction with the accompanying drawing wherein.

Figures 1, 2:
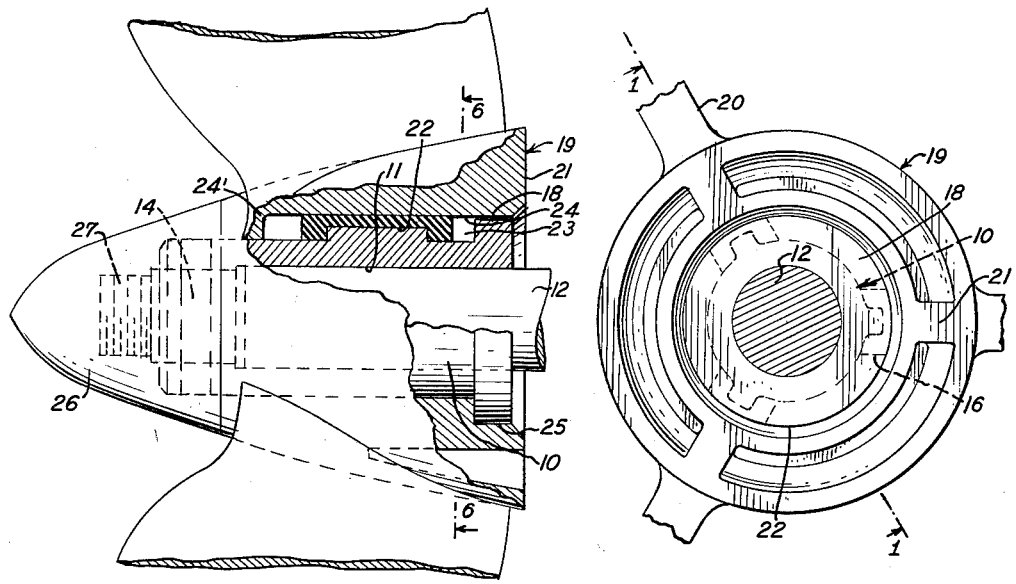
FIG. 1 is a fragmentary side elevational view of a propeller and propeller shaft incorporating the drive means of this invention, the parts shown in section for greater clarity being taken substantially on the line 1—1 of FIG. 2.
FIG. 2 is a rear elevational view of the structure shown in FIG. 1.
Figures 3, 4, 5:
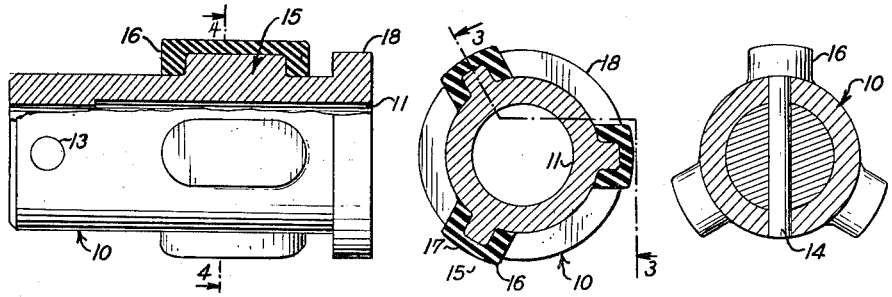
Figure 6:
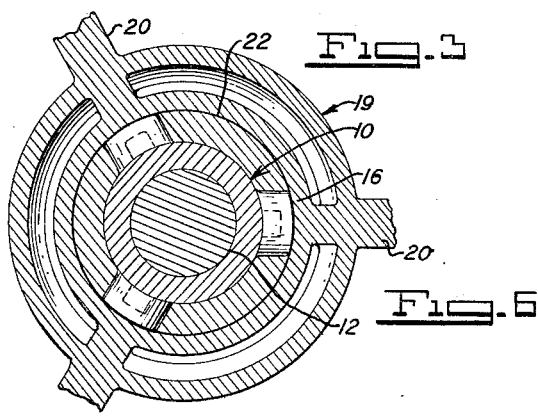

FIG. 3 a side elevational view with parts in section for greater clarity and taken substantially on the line 3—3 of FIG. 4 and showing the sleeve utilized to mount the propeller on the propeller shaft;

FIG. 4 a sectional view taken substantially on the line 4—4 of FIG. 3;

FIG. 5 a transverse sectional view through the sleeve shaft and propeller shaft and showing the relative position of the shear pin;

FIG. 6 a sectional view taken substantially on the line 6—6 of FIG. 1;

FIG. 7 a fragmentary side elevational view similar to FIG. 1, but showing a modified form of the invention and with the parts in section taken substantially on the line 7—7 of FIG. 8;

FIG. 8 a rear elevational view of the structure shown in FIG. 7;

FIG. 9 a side elevational view with parts in section for greater clarity and taken substantially along the line 9—9 of FIG. 10 and showing the sleeve utilized to mount the propeller on the propeller shaft;

FIG. 10 is a sectional view taken substantially on the line 10—10 of FIG. 9;

FIG. 11 an end elevational view of a lug collet utilized between the sleeve of FIG. 9 and the hub of the propeller; and FIG. 12 a sectional view taken substantially on the line 12—12 of FIG. 11.

With continued reference to the drawing and particularly FIGS. 1 to 6, there is shown a shock absorbing full floating resilient positive drive means for marine propellers constructed in accordance with this invention and which drive means may well comprise an elongated sleeve 10 having a bore 11 extending therethrough for receiving a propeller shaft 12, such as that commonly provided on a conventional outboard motor. The sleeve 10 is provided with a transverse aperture 13 for receiving a shear pin 14 which extends through the propeller shaft 12 and through the aperture 13 in the sleeve 10.

A plurality of radially projecting circumferentially spaced ribs 15 are provided on the elongated sleeve 10 and it is to be noted that the ribs 15 are of less length than the sleeve 10. Surrounding the side walls of each rib 15 is a layer 16 of yieldable material, such as rubber or other suitable material and as clearly shown in FIG. 3, the layer 16 also surrounds the end surfaces of the ribs 15. The outer surfaces 17 of the ribs 15 are also covered with yieldable material as clearly shown in FIGS. 3 and 4. The elongated sleeve 10 is also provided at one end thereof opposite the aperture 13 with an annular flange 18 which serves to facilitate mounting of a propeller on the sleeve 10 and also in the event of damage to the propeller serves to limit tilting of the propeller relative to the sleeve 10 to an amount equal to the clearance between the flange 18 and the bore in the propeller hub.

A conventional propeller 19 is provided with blades 20 extending radially from a hub 21 and such hub is provided with a bore 22 extending axially therethrough. Provided in the wall of the axial bore 22 in the hub 21 are a plurality of axial grooves 23 and each of these grooves 23 terminates in a shoulder 24. It is to be noted, that the grooves are complementary to the ribs 15 and the layer of yieldable material 16 surrounding the same and it is also to be noted, that the bottom surfaces 24 of the grooves 23 are formed on a slightly greater diameter than the outer surfaces 17 of the ribs 15 whereby when the propeller hub 21 is positioned on the sleeve 10 with the ribs 15 and layers of yieldable material 16 received in the grooves 23, the outer portions of the yieldable material will be compressed between the outer surfaces 17 of the ribs 15 and the bottom surfaces 24 of the grooves 23. This provides a firm resilient engagement between the hub 21 and the sleeve 10 thereby maintaining the propeller 19 and sleeve 10 in alignment.

The annular recess 25 in the inner end of the hub 21 serves to receive the annular flange 18 on the sleeve 10. The drive means of this invention is assembled with the propeller shaft 12 merely by inserting the sleeve 10 over the propeller shaft 12 and inserting a shear pin 14 through the aperture 13 in the sleeve 10 and through the propeller shaft 12, after which the hub 21 of the propeller 19 may be applied to the sleeve 10 with the ribs 15 and layers of yieldable material 16 received in the grooves 23 and tightly engaging the bottom and sidewalls thereof. The sleeve 10 and propeller 19 may be retained on the propeller shaft 12 by a conventional spinner nut 26 applied to the threaded end 27 of the propeller shaft 12.

It will thus be seen that all torque transmitted from the propeller shaft 12 to the propeller 19 will be through the ribs 15 and layers of yieldable material 16 and since the ribs 15 and such layers of yieldable material 16 are received in the grooves 23 of the propeller hub 21, there will be a positive drive at the layers 16 of yieldable material which will provide a sufficient cushioning effect to reduce the shock occasioned by starting of the motor or engaging the clutch connecting the drive shaft and propeller shaft. Furthermore, the thrust developed by the propeller 19 will be transmitted to the propeller shaft 12 through the yieldable material 16 and the ribs 15 to the sleeve 10 and to the propeller shaft 12. There is, therefore, provided a fully cushioned or shock absorbing positive drive means for a propeller and furthermore, the structure as described above, provides for accurate alignment between the propeller and the propeller shaft. All slippage between the propeller and the propeller shaft is prevented and under no circumstances, can the propeller shaft and propeller become misaligned.

The shear pin 14 will operate in identically the same manner as with conventional propeller mountings and in the event the propeller is damaged, the same may be conveniently removed and replaced merely by removing the spinner nut 26 whereupon the damaged propeller may be removed by sliding the same endwise on the sleeve 10 and a new propeller installed by sliding the same onto the sleeve 10 with the ribs 15 and layers of yieldable material 16 received in the grooves 23 in the propeller hub 21.

A modified form of the invention is shown in FIGS. 7 to 12 in which there may be provided an elongated sleeve 28 having a transverse aperture 29 for receiving the conventional shear pin 30 extending through a propeller shaft 31 and the sleeve 28 is provided with a plurality of radially projecting circumferentially spaced ribs 32, as well as an axial bore 33 for receiving the propeller shaft 31. The ribs 32 are completely covered on all sides by a layer 34 of yieldable material, such as rubber or other suitable material. Also provided on the sleeve 28 on the end opposite the aperture 29 is an annular flange 35, the purpose of which will be later described.

While the form of the invention described above and shown in FIGS. 1 to 6 is primarily intended for incorporation in new outboard motors or in new marine equipment, the form of the invention shown in FIGS. 7 to 12 is primarily intended for use in existing equipment by a relatively simple modification of the conventional propeller. A conventional propeller 36 having blades 37 projecting from a hub 38, provided with an axial bore 39 in the hub 38 terminating in a shoulder 40. A counterbore 41 is provided adjacent the shoulder 40 and such counterbore terminates in a shoulder 42.

With particular reference to FIGS. 11 and 12, there is shown a bushing 43 of a diameter to snugly fit in the bore 39 and engage the shoulder 40 in the propeller hub 38. The bushing 43 is provided with a plurality of inwardly opening grooves 44 in the inner surface of the bushing 43 and extending axially therethrough and the grooves 44 are of a size to snugly receive and compress the layers 34 of yieldable material surrounding the ribs 32 on the sleeve 28. The bushing 43 may be conveniently secured in the bore 39 of the hub 38 by a plurality of set screws 45 threadedly received in the hub 38 of the propeller 36 and projecting into radial apertures 46 in the exterior surface of the bushing 43. If desired, the apertures 46 may be threaded as shown in FIG. 12, but these apertures might also be tapered to receive the tapered ends of the set screws 45 and thereby securely lock the bushing 43 in place in the bore 39 in the hub 38.

The drive means in the form of the invention shown in FIGS. 7 to 12 is assembled by sliding the sleeve 28 over the propeller shaft 31 and inserting a shear pin 30 through the aperture 29 in the sleeve 28 and the propeller shaft 31 and thereafter, sliding the propeller hub 38 with the bushing 43 installed therein over the sleeve 28 with the yieldable layers 34 on the ribs 32 received in the grooves 44 and with the yieldable layers 34 tightly received in the grooves 44 and with the yieldable layers 34 tightly engaging the bottom and sidewalls of the grooves 44. The propeller 36 as well as the sleeve 28 are secured on the propeller shaft 31 by a conventional spinner nut 47 threadedly received on the threaded end 48 of the propeller shaft 31.

The only modification of a conventional propeller necessary to accommodate the drive means of this invention is to enlarge the bore in the hub of the propeller sufficiently to receive the bushing 43 and to provide the set screws 45 in the propeller hub to securely lock the bushing 43 in place therein. The propeller 36 may be removed and replaced if necessary, merely by removing the spinner nut 47 and sliding the hub 36 from the sleeve 28, whereupon a new propeller may be installed thereon by sliding the same axially and re-applying the spinner nut 47.

The form of the invention shown in FIGS. 7 to 12 is primarily intended for use with outboard motors of medium and lower horsepower, such as up to and including twenty-five horsepower, and while both forms of the invention have been described primarily for use on outboard motors, it is to be understood, that this is for illustrative purposes only and that the principles of the invention may be well utilized for providing a drive means between a propeller shaft and propeller installed on a boat having an inboard engine.

It will be obvious to those skilled in the art that various changes may be made in the invention without departing from the spirit and scope thereof and therefore the invention is not limited by that which is shown in the drawing and described in the specification, but only as indicated in the appended claim.

What is claimed is:

A shock absorbing full floating resilient positive drive means for marine propellers, said drive means comprising an elongated sleeve having a bore extending therethrough for receiving a propeller shaft, a transverse aperture in said sleeve adjacent one end for receiving a shear pin projecting transversely of said propeller shaft, a plurality of radially projecting circumferentially spaced ribs on said sleeve, said ribs being of less length than said sleeve, a separate layer of yieldable material bonded to the entire side and entire outer surface of each rib, an annular flange on the end of said sleeve opposite said transverse aperture, a propeller having a hub, an axial bore in said hub, a plurality of axial grooves and a recess in the wall of said axial bore, said ribs being received in said grooves with said yieldable material tightly compressed and engaging the bottom and sidewalls of said grooves with said flange received in said recess, the portions of said hub between said grooves engaging said sleeve, whereby all torque and thrust is transmitted through said yieldable material as a compressive force and tilting of said propeller is limited by said flange and recess in the event of damage to said propeller and means for retaining said propeller and said sleeve on said propeller shaft.

References Cited in the file of this patent

UNITED STATES PATENTS

| | | |
|---|---|---|
| 309,679 | Bacon | Dec. 23, 1884 |
| 2,111,245 | Irgens | Mar. 15, 1938 |
| 2,164,485 | Yantis | July 4, 1939 |
| 2,235,605 | Bugatti | Mar. 18, 1941 |
| 2,333,166 | Fraser | Nov. 2, 1943 |
| 2,469,116 | Kiekhaefer | May 3, 1949 |
| 2,739,462 | Wincenciak | Mar. 27, 1956 |

FOREIGN PATENTS

| | | |
|---|---|---|
| 798,315 | France | Mar. 2, 1936 |
| 929,544 | Germany | June 27, 1955 |